(12) United States Patent
Mahapatra et al.

(10) Patent No.: US 10,027,534 B1
(45) Date of Patent: Jul. 17, 2018

(54) LOG MANAGEMENT SYSTEM AND METHOD FOR DISTRIBUTED COMPUTING SYSTEMS

(71) Applicant: VCE Company, LLC, Richardson, TX (US)

(72) Inventors: Akshaya Mahapatra, San Jose, CA (US); Vandana Rao, San Jose, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 297 days.

(21) Appl. No.: 14/723,006

(22) Filed: May 27, 2015

(51) Int. Cl.
*H04L 12/24* (2006.01)
*H04L 12/911* (2013.01)

(52) U.S. Cl.
CPC .......... *H04L 41/069* (2013.01); *H04L 47/783* (2013.01)

(58) Field of Classification Search
CPC .......................... H04L 47/783; H04L 41/069
USPC ......................................................... 709/226
See application file for complete search history.

(56) References Cited

U.S. PATENT DOCUMENTS

| | | | | |
|---|---|---|---|---|
| 8,381,193 B2* | 2/2013 | Cervantes | ............. | H04L 41/069 715/204 |
| 8,549,542 B1* | 10/2013 | Maguire | ................ | H04L 41/065 709/223 |
| 2005/0193004 A1* | 9/2005 | Cafeo | ............... | G06F 17/30368 |
| 2007/0283194 A1* | 12/2007 | Villella | ............... | G06F 11/3476 714/57 |
| 2008/0005334 A1* | 1/2008 | Utard | .................. | G06F 11/1076 709/226 |
| 2008/0195671 A1* | 8/2008 | Kim | ........................ | H04L 41/00 |
| 2010/0005167 A1* | 1/2010 | Kishimoto | ......... | H04N 1/00347 709/224 |
| 2010/0161574 A1* | 6/2010 | Davidson | .......... | G06F 17/30306 707/705 |
| 2012/0005542 A1* | 1/2012 | Petersen | ............. | G06F 11/0709 714/48 |
| 2013/0212576 A1* | 8/2013 | Huang | ................ | G06F 9/45558 718/1 |
| 2014/0280940 A1* | 9/2014 | Chapman | ................ | H04L 41/50 709/225 |

FOREIGN PATENT DOCUMENTS

CN          102799514 A  * 11/2012   ........... H04L 41/069

* cited by examiner

Primary Examiner — Michael C Lai
(74) Attorney, Agent, or Firm — Polsinelli PC (57) ABSTRACT

A log management system includes a computer executable application that may be executed to obtain a first log entry from a first resource of a distributed computing system having multiple resources, and obtain resource information about at least one other resource of the distributed computing system that is correlated with the first resource. From the resource information, the application obtains one or more log entries from the correlated resource, and displays the first log entry and the correlated log entry on a display.

20 Claims, 7 Drawing Sheets

LOG MANAGEMENT SYSTEM AND METHOD FOR DISTRIBUTED COMPUTING SYSTEMS

TECHNICAL FIELD

Aspects of the present disclosure relate to computing devices and, in particular, to a log management system and method for distributed computing systems.

BACKGROUND

The advent of network and virtualization computing technologies have enabled the implementation of relatively large distributed computing systems that are extensible to manage the ever changing needs of users while providing enhanced reliability and availability. For example, the advent of virtualization technologies has provided for virtualized resources that may be added or removed on demand according to ever changing needs of applications or services executed on those resources. Additionally, currently available network topologies, such as the Internet and private networks, have provided means for remotely accessing large amounts of diverse information and computing power. These distributed computing systems are typically implemented using multiple computing devices that function in a collaborative manner to provide services for multiple users.

SUMMARY

According to one aspect of the present disclosure, a log management system including a computer executable application that may be executed to obtain a first log entry from a first resource of a distributed computing system having multiple resources, and obtain resource information about at least one other resource of the distributed computing system that is correlated with the first resource. From the resource information, the application obtains one or more log entries from the correlated resource, and displays the first log entry and the correlated log entry on a display.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Embodiments of the present disclosure provide a system for correlating log entries from multiple resources of a distributed computing system such that an enhanced analysis may be provided for those resources that may affect the operation of one another. Whereas traditional log aggregation and analysis systems typically provide a limited ability to associate the operation of certain resources with one another, they typically do not have the ability to associate the log entries of hardware resources with applications, such as virtual machines, executed on those hardware resources. Embodiments of the present disclosure provide a solution to this problem, among other problems, by providing a system that correlates log entries from one resource of a distributed computing system with the log entries of other resources to provide a correlated logfile from which enhanced analysis of the operation of those resources may be provided.

Computing resources, such as those used in a distributed computing system, often generate logfiles that can be used to analyze their operation. Each logfile typically comprises log entries that include information associated with its respective resource. The information may include, for example, general status information about the resource, information that may be used for debugging purposes, and/or information associated with events that occur on the resource. For example, when a resource encounters an exception or even due to some event, such as a failure of some component of the resource, a failure of an application executed on the resource, an external event, and the like, a log entry may be generated including information about that exception. Log entries, such as these, are accumulated in a logfile and may be useful to determining the cause of the exception.

To manage logfiles of the resources of a distributed computing systems that may be relatively complex in design and structure, log aggregation and analysis applications have been developed. An example log aggregation and analysis application includes a Splunk™ log aggregation and analysis application, provided by Splunk Corporation. Splunk appears to provide log aggregation from multiple resources using a web-style interface. Another example log aggregation and analysis application includes Log Insight™ provided by VMWare corporation. Log Insight™ is particularly well adapted to managing logfiles of the resources of virtualized computing environments. Both the Splunk™ application and Log Insight™ application accept logfiles from multiple sources, indexes the entries, and allow users to search through the logfiles.

Nevertheless, such conventional log aggregation and analysis applications are limited in their ability to track or identify log information based upon the physical structure of a distributed computing system. Because distributed computing systems are often implemented with multiple resources that function together to perform tasks or services in a collaborative manner, the operation of one resource may be dependent upon the operation of one or more other resources. For example, a first group of blades of a typical blade array may be communicatively coupled (e.g., via Ethernet connections) to a second group of blades of the blade array, while a third group of blades is communicatively coupled (e.g., via other Ethernet connections) to a fourth group of blades. Thus, the operation of the second group of blades may be dependent upon the operation of the first group of blades, while the fourth group of blades may be dependent upon the third group of blades. Because conventional log aggregation and analysis applications do not typically have this physical information about the blade array, correlations among certain resources cannot be formed to provide enhanced information that may be used for analysis using logfiles generated by those resources. Thus, the inability to correlate leg entries of related resources of a distributed computing system by conventional log aggregation and analysis applications may render the underlying root cause of certain operational conditions of the resources difficult to find.

Figure 1A:
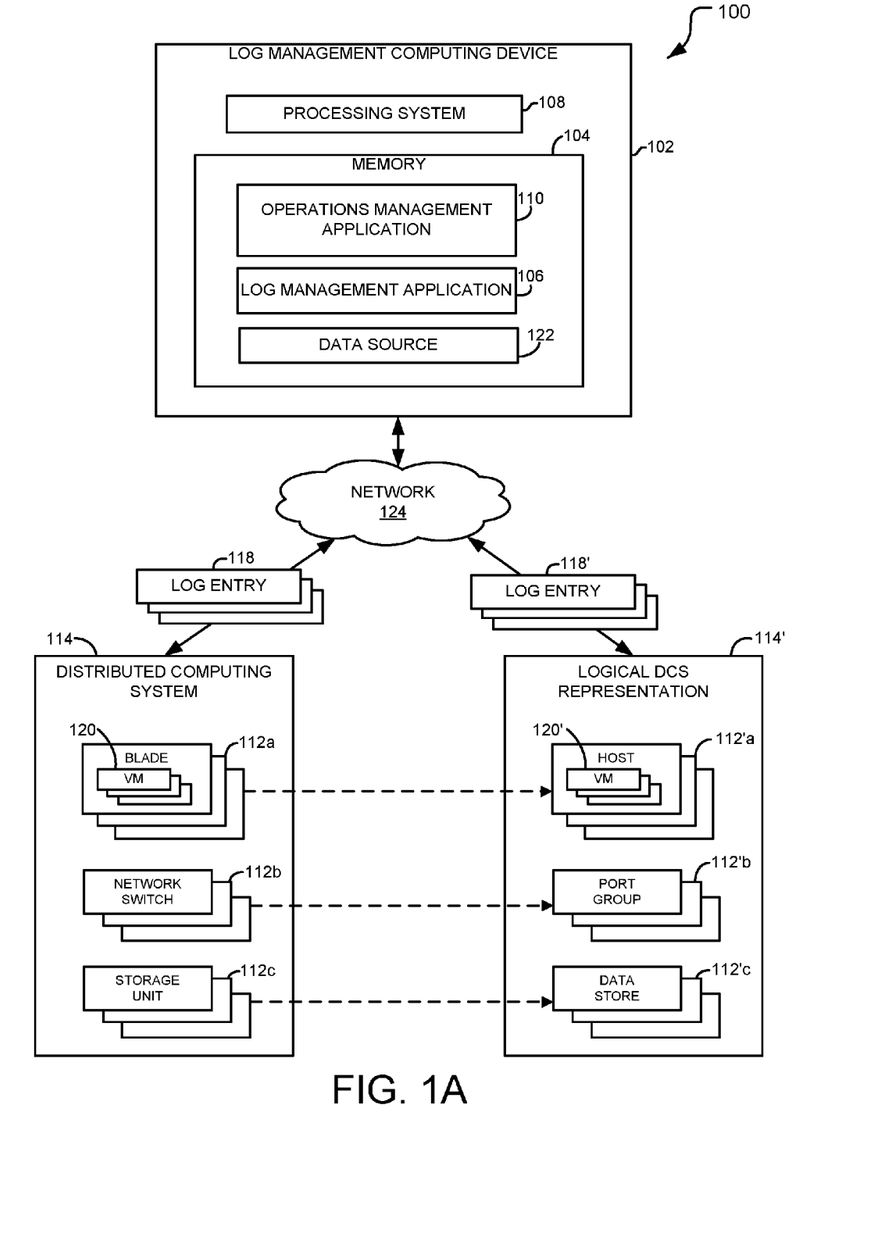
FIGS. 1A and 1B illustrate an example log management system according to one embodiment of the present disclosure.
Figure 1B:
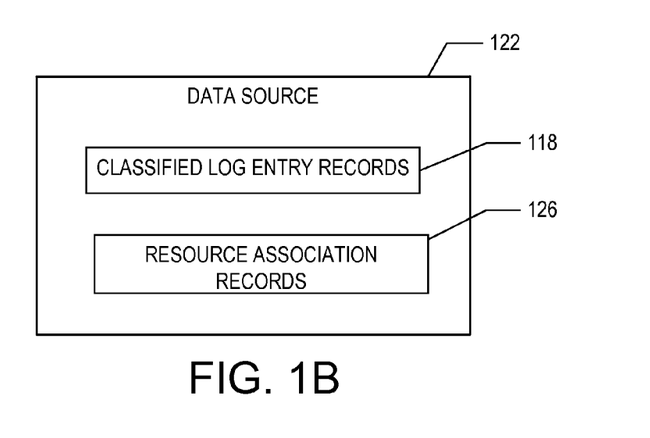

FIG. 1A illustrates an example log management system 100 according to the teachings of the present disclosure. FIG. 1B illustrates a data source 122 of the log management system 100 of FIG. 1A. The system 100 includes a log management computing device 102 having a memory 104 for storing a log management application 104 that is executed by a processing system 108. The system 100 also includes an operations management application 110 that manages the operation of a distributed computing system (DCS) 114 having multiple resources, such as one or more blades 112a, one or more network switches 112b, and/or one or more storage units 112c. The operations management application 110 generates a logical DCS representation 114' of the distributed computing system 114 that includes logical resource representations (e.g., virtual machines 120' representing virtual machines 120, hosts 112a' representing the blades 112a, port groups 112b' representing the network switches 112b, and data stores 112c' representing the storage units 112c). As will be described in detail herein below, the log management application 106 communicates with the distributed computing system 114 to receive log entries 118 created by the hardware resources 112a-c and correlates them with received log entries 118' of their respective logical resource representations 112'a-c to provide for enhanced analysis of the distributed computing system 114.

In general, conventional operations management systems generate logical resource representations 112'a-c of respective resources 112a-c in a distributed computing system 114 to provide for their management. Additionally, conventional operations management application 110 may generate and manage virtual machines (VMs) 120 on certain resources, such as blades 112a. Hardware resources 112a-c of a distributed computing system 114 are often configured to generate their own log entry information for status assessment, debugging purposes, and other forms of general information. However, this information is often not made available to operations management systems 110 that could otherwise utilize such information. That is, log entry information provided by conventional logical resource representations 112'a-c do not provide all information that may be obtained from the resources 112a-c themselves. Embodiments of the present disclosure provide a solution to this problem by correlating log entries 118 received from the resources 112a-c of a distributed computing system 114 with log entries 118' of logical resource representations 112'a-c so that additional information may be obtained for enhanced analysis of the received log entries 118, 118'.

The operations management application 110 manages various activities of the distributed computing system 114 by generating logical resource representations 112'a-c of their respective resources 112a-c. For example, the operations management application 110 may manage the allocation and de-allocation of resources, such as hosts and virtual objects used by the distributed computing system 114. Additionally, the operations management application 110 may manage the remediation of failures in the system by monitoring the health of each resource and performing corrective measures, such as migration (e.g., failover) to different resources in the event that certain resources have failed. The operations management application 110 may be any suitable type, such as a VSPHERE™ software suite that is available from VMware Corporation, which is located in Palo Alto, Calif.

The distributed computing system 114 may be any suitable type, such as a computer cluster, a computing grid, a blade array, and/or other computing infrastructure having multiple resources that can be managed by an operations management application 110. The distributed computing system 114 as shown includes a blade computing device 112a, a network switch 112b (e.g., a virtual local area network (VLAN) device), and a storage device 112c (e.g., a logical unit number (LUN) device). Nevertheless, it should be appreciated that the distributed computing system 114 may include any number and type of hardware resources, such as data processing devices, data storage devices, servers, networking equipment, and/or other computing devices.

In one embodiment, the distributed computing system 114 comprises a converged infrastructure (CI), also sometimes referred to as a unified computing system, a fabric-based computing system, an integrated infrastructure system, and a dynamic infrastructure. In another embodiment, the distributed computing system 114 comprises a combination of converged infrastructures configured in a cloud computing environment. An example CI that may be implemented for use with embodiments of the present disclosure are described in detail herein below.

The resources 112a-c of the distributed computing system 114 generally represent hardware resources and/or one or more virtual objects executed on those hardware resources, which may be implemented in a virtualized computing environment. The virtualized computing environment may be embodied in any computing system that provides virtualized components (e.g., virtual objects) executed on one or more physical resources. Such a computing environment may be provided in whole or in part through a converged infrastructure.

Converged infrastructures typically refer to computing systems implemented in a virtualized computing environment that includes a structured combination of multiple virtual objects that are executed on independently functioning hardware resources commonly referred to as hosts. Distributed computing systems implemented in a virtualized computing environment may be advantageous in that they are dynamically configurable to continually adapt to ever changing requirements typically exhibited by modern distributed computing systems. Converged infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large data center environments, converged infrastructures may involve a pool of server, storage and networking capacities, typically virtualized, that can shared by multiple applications.

The operations management application 110 generates logical resource representations 112'a-c of the hardware resources 112a-c and VMs 120 of the distributed computing system 114 to provide for their management. For example, the operations management application 110 may generate a logical resource representation 112'*a-c* that may be displayed on a display for view by a user. The logical resource representation 112'*a-c* may also include various parameters associated with its respective hardware resource 112*a-c*, such as an amount of memory configured on the hardware resource 112*a-c*, a rated speed of one or more processors configured on the hardware resource 112*a-c*, the quantity of network ports (e.g., Ethernet ports) configured on the hardware resource 112 *a-c*, and the like.

Nevertheless, each resource 112*a-c* may have a certain configuration parameters that are not known by the logical resource representation 112'*a-c*. For example, a certain hardware resource 112*a-c* may have a communication port that is physically connected to a communication port of another hardware resource 112*a-c*, a characteristic not easily detectable or obtainable by conventional operations management systems. Additionally, each hardware resource 112*a-c* is typically configured with firmware for bootstrapping its respective resource, and an operating system that administers its operation, each of which may often generate logfiles that may be useful for analysis. According to embodiments of the present disclosure, the log management application [[104]] 106 receives log entries from these generated logfiles in real-time and/or at periodic or aperiodic intervals, and correlates the received log entries with log entries of their corresponding logical resource representation 112'*a-c* counterparts. The correlated log entries may be displayed on a display for their analysis or stored in a data source 122 for analysis at a later time.

The log management application 106 and the distributed computing system 104 communicate with one another using a communications network 124. Nevertheless, the log management application 106 and the distributed computing system 114 may communicate with one another in any suitable manner. For example, the log management computing device 102 and the distributed computing system 114 communicate with each other using wireless, wired, and/or optical communications. In one embodiment, the log management application 106 and the distributed computing system 114 communicate with one another using a communication network 124, such as the Internet, an intranet, or other wired and/or wireless communication networks. In another embodiment, the log management application 106 and the distributed computing system 114 communicate with one another using any suitable protocol or messaging scheme. For example, these networks may communicate using a Hypertext Transfer Protocol (HTTP), extensible markup language (XML), extensible hypertext markup language (XHTML), or a Wireless Application Protocol (WAP) protocol. Other examples of communication protocols exist. For example, the log management application 106 and the distributed computing system 114 may communicate with one another without the use of a separate or a distinct network. Additionally, other embodiments contemplate that the modules employed by the log management application 106 are executed by a computing device configured on the distributed computing system 114.

The data source 122 stores classified log entries and resource association records 126. The classified log entries include log entries 118, 118' received from the hardware resources 112*a-c* and logical resource representations 112'*a-c* that have been classified to include unique identifying information, such as a universally unique identifier (UUID). The resource association records 126 include information for associating the resources 112*a-c*, 112'*a-c* with one another. For example, the resource association records 126 may include a hash table, or other similar logical structure, that associates a hardware resource 112*a-c* (e.g. using its UUID) with its respective logical resource representation 112'*a-c*. For another example, the resource association records 126 may include a table that associates resources with other resources due to some dependency, such as a communication link between two or more resources, a common source of electrical power used by two or more resources, a common type and version of operating system configured on two or more resources, and the like.

Figure 2A:
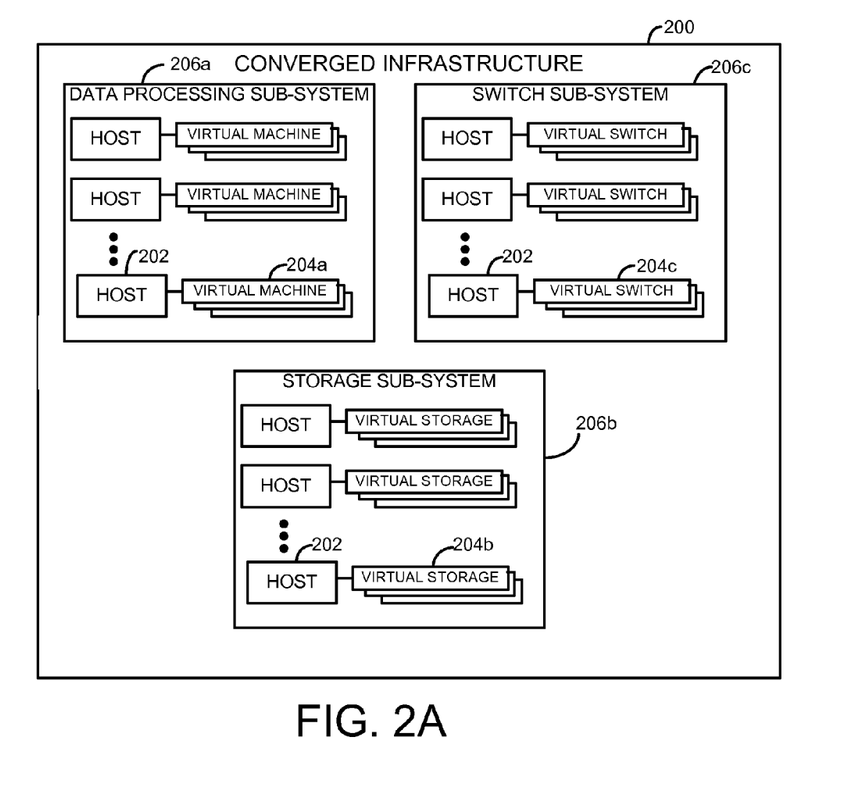
FIGS. 2A and 2B illustrate an example converged infrastructure that may be implemented as a distributed computing system according to one embodiment of the present disclosure.

FIG. 2A illustrates an example converged infrastructure 200 that may be implemented as a distributed computing system 114 according to the teachings of the present disclosure. The converged infrastructure 200 may be any type having multiple hosts 202 that each executes one or more virtual objects (e.g., virtual machines 204*a*, virtual storage objects 204*b*, and virtual switch objects 204*c*). The hosts of a converged infrastructure are often referred to as compute servers. Nevertheless, a 'host' may be any physical device and/or component that supports the operation of virtual resources and services provided by those virtual resources. The particular converged infrastructure 200 as shown includes several sub-systems, such as a data processing sub-system 206*a*, a data storage sub-system 206*b*, and a switch sub-system 206*c*. Nevertheless, it should be understood that other converged infrastructures may include additional, fewer, or different types of sub-systems without departing from the spirit and scope of the present disclosure.

In one aspect, the data storage sub-system 206*b* includes computer-readable memory structures for storing data used by the converged infrastructure 200, which may include network attached storage (NAS) arrays and/or storage area network (SAN) arrays that are facilitated by multiple virtual objects (e.g., virtual storage objects 204*b*). The switch sub-system 206*c* provides for communication among the various sub-systems of the converged infrastructure 200, and may include components, such as fabric interconnect systems, Ethernet switches/routers, multilayer director switches (MDSs), and the like. The data processing sub-system 206*a* executes applications that access, store, and otherwise manipulate data stored by the converged infrastructure 200. For a particular example, either of the data storage sub-system 206*b*, the switch sub-system 206*c*, and/or the data processing sub-system 206*a* may comprise a blade computing platform having multiple hosts (e.g., blade computing devices) that each executes one or more virtual objects.

Each sub-system includes multiple hosts 202 that each executes one or more virtual objects, which in this particular example, are virtual machines (VMs) 204*a*, virtual storage objects 204*b*, and virtual switch objects 204*c*. For example, virtual objects, such as the VMs 204*a* may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware corporation, which is located in Palo Alto, Calif.

Figure 2B:
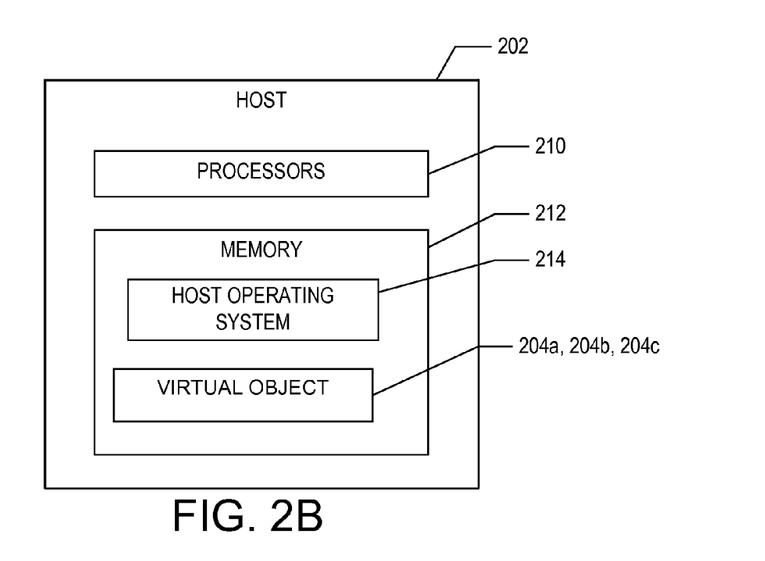

FIG. 2B illustrates an example host 202 implemented on each converged infrastructure 200 according to one aspect of the log management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

Figure 3:
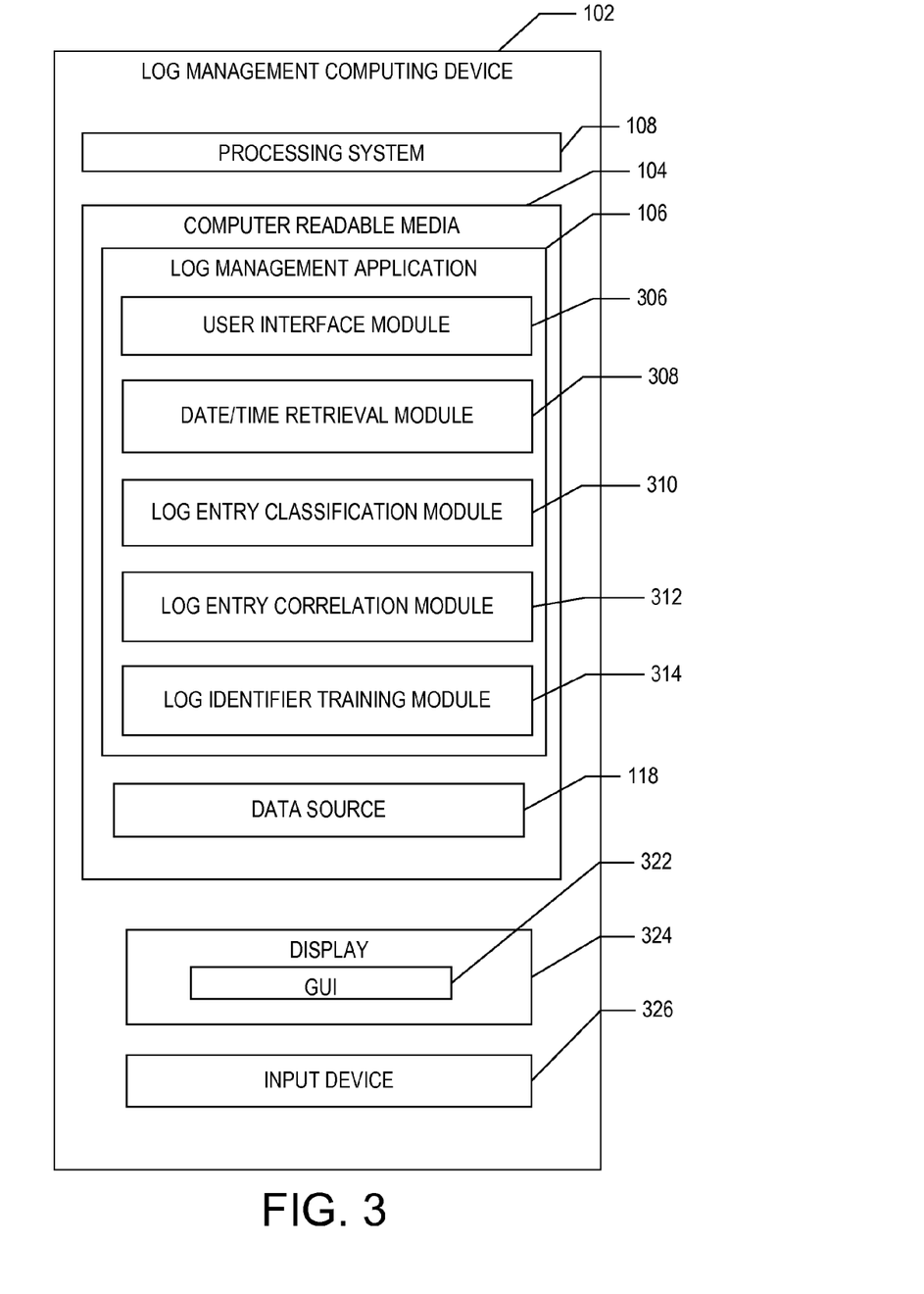
FIG. 3 illustrates a block diagram of an example log management application executed on the log management computing device according to one embodiment of the present disclosure.

Referring now in more detail to FIG. 3, a block diagram of an example log management application 106 executed on the log management computing device 102, is depicted according to one aspect of the present disclosure. The log management application 106 is stored in a memory 104 (e.g., computer readable media) and executed on a processing system 108 of the log management computing device 102. The log management computing device 102 may include any type of computing system, such as one or more management computing systems, personal computers, mobile computers and/or other mobile devices, and other hosts.

According to one aspect, the log management computing device 102 also includes a graphical user interface (GUI) 322 displayed on the display 324, such as a computer monitor, for displaying data. The log management computing device 102 also includes an input device 326, such as a keyboard or a pointing device (e.g., a mouse, trackball, pen, or touch screen) to enter data into or interact with the GUI 322. According to one aspect, the log management application [[104]] 106 includes instructions or modules that are executable by the processing system 302 as will be described in detail herein below.

The memory 104 includes volatile media, nonvolatile media, removable media, non-removable media, and/or another available medium. By way of example and not limitation, non-transitory computer readable medium comprises computer storage media, such as non-transient storage memory, volatile media, nonvolatile media, removable media, and/or non-removable media implemented in a method or technology for storage of information, such as computer readable instructions, data structures, program modules, or other data.

A user interface module 306 facilitates the receipt of input data and/or output data from or to a user, respectively. In one example, the user interface module 306 receives and processes requests to receive and display log entries from a particular resource, such as one of resources 112a-c or logical resource representations 112'a-c, and any other resources that may be correlated with that particular resource. Additionally, the user interface module 306 also facilitates receipt of input data from the user to store or otherwise manage information in the resource association records 126. For example, when a communication port of a first resource is physically coupled to the communication port of a second resource, the user interface module 306 may be used to modify the resource association records 126 to indicate that the first resource is now correlated with the second resource 112.

A date/time retrieval module 308 accesses a system clock, such as a real-time clock executed on the log management computing device 102, to receive a current date and time that may be used to tag each log entry 118, 118' as it is received. While many log entries are often tagged with the date and time from the clock executed on the resource from which they are generated, the clock from each resource may not be adequately synchronized with one another. The date/time retrieval module 308 provides a solution to this problem by replacing the date/time entry from the received log entry 118, 118' with a date/time value from a single, common clock source such that all log entries 118, 118' may be inherently synchronized with one another.

A log entry classification module 310 classifies log entries received from resources according to their identity. For example, the log entry classification module 310 may modify a log entry 118, 118' to include a unique identifier, such as a UUID, of the resource that generated the log entry. The unique identifying information may be obtained in any suitable manner. For example, the unique identifying information may be obtained from the source address included in a data packet that encapsulates the log entry 118, 118'. The log entry classification module 310 reads the source address and appends or adds a UUID or other form of identifying information to the received log entry.

A log entry correlation module 312 correlates the log entry 118, 118' with the log entries 118, 118' of one or more other resources that may be correlated with that resource. For example, the log entry correlation module 312 may receive a classified log entry from the log entry correlation module 310 and, using unique identifying information included in the classified log entry, access the resource association records 126 to determine any other resources exist that may be correlated with the resource that generated the log entry 118. Thereafter, the log entry correlation module 312 may access one or more of the other resources that are correlated with that resource.

In one embodiment, the log entry correlation module 312 may combine the log entries from certain resources according to user input obtained through the user interface module 306. For example, a user may wish to only combine log entries from a hardware resource 112a-c and its associated logical resource representation 112'a-c. In such a case, the log entry correlation module 312 may receive user input from the user interface module 306 and filter the log entries such that only log entries from the hardware resource 112a-c and its associated logical resource representation 112'a-c are combined.

The log entry correlation module 312 may display the combined log entries on the display 326, or store the combined log entries in the classified log entry records of the data source 122 for analysis at a later time.

A log identifier training module 314 provides a component identifier correlation user interface for correlating component identifiers from multiple disparate log providers. A distributed computing environment may include numerous systems that generate logfiles, such as the operating system of each resource, applications executed on each resource, the firmware of each resource, management systems used to monitor and control each resource, and the like. For example, UCS Manager™ provided by Cisco Corporation includes "dn" as the component identifier, while Virtual Center™ provided by VMware™, includes a UUID as the component identifier. The log identifier training module 314 provides a user interface that allows the user to determine which type of component identifier is to be provided by each log provider such that, when the log entry classification module 312 encounters a log entry from that log provider, that log entry may be associated with other log entries from other correlated log providers.

It should be appreciated that the modules described herein are provided only as examples, and that the log management application 106 may have different modules, additional modules, or fewer modules than those described herein. For example, one or more modules as described in FIG. 3 may be combined into a single module. As another example, certain modules described herein may be encoded on, and executed on other computing systems, such as on one of the resources 112a-c, 112'a-c of the distributed computing system 114.

Figure 4:
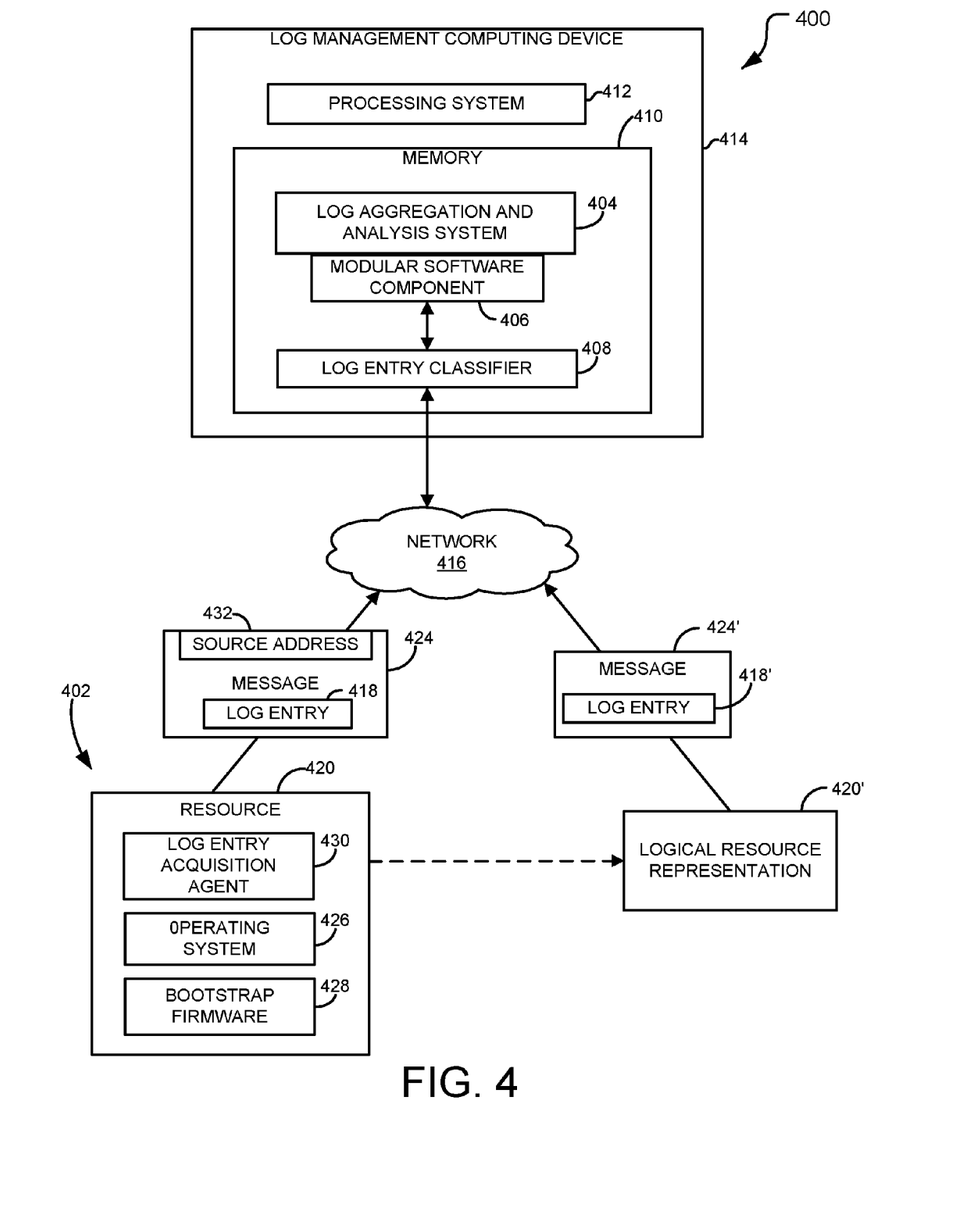
FIG. 4 illustrates another example log management system according to one embodiment of the present disclosure.

FIG. 4 illustrates an example implementation of a log management system 400 that may be implemented for use with a distributed computing system 402 operating in a virtualized environment according to one embodiment of the present disclosure. The particular log management system 400 includes a log aggregation and analysis application 404 configured with a modular software component (e.g., a plug-in) 406, and a log entry classifier 408 that are stored in a memory 410 and executed by a processing system 412 of a computing device 414. A communication network 416 functions in a manner that is similar to the communication network 124 of FIG. 1A. As will be described herein below, the modular software component 406 and the log entry classifier 408 enable a conventional log aggregation and analysis application 404 to process log entries 418 from a resource 420 along with log entries 418' from a corresponding logical resource representation 420' associated with the resource 420.

The example distributed computing system 402 operates in a virtualized computing environment, such as a converged infrastructure including components found in one of several Vblock™ System infrastructure packages available from VCE, LLC, which is headquartered in Richardson, Tex. Although the distributed computing system 402 includes multiple hardware resources, only one hardware resource 420 is shown for brevity and clarity of description.

The modular software component 406 includes functionality similar to that described above with reference to the log entry correlation module 312 of FIG. 3, while the log entry classifier 408 includes functionality similar to that described above with reference to the log entry classifier module 310 and date/time retrieval module 308 of FIG. 3. The modular software component (e.g., plug-ins, add-ons, extensions, etc.) 406 may be deployed on a conventional log aggregation and analysis application using an application program interface (API) specifically designed for use with that log aggregation and analysis application. That is, the log aggregation and analysis application 404 may include a plug-in interface that provides one or more interface mechanisms for interfacing with the log entry correlation module 312 such that the log aggregation and analysis application may function as the user interface module 306 for requesting correlated log entries, receiving the correlated log entries, and displaying the correlated log entries on its dashboard, via its display.

The log aggregation and analysis application 404 may be any type that processes and provides for virtual views of log entries from multiple logical resource representations 420' functioning in a virtualized computing environment. In one embodiment, the log aggregation and analysis application 404 includes the Log Insight™ application package provided by VMWare Corporation, which is located in Palo Alto, Calif. The Log Insight™ application package provides an API for configuration of a modular software component for adding functionality. In this particular case, the modular software component 406 may be configured as a plug-in with the Log Insight™ software package to introduce log entries 420 from hardware resources 420 in which each log entry 420 includes a time stamp and a unique identifier for correlation with other resources, such as its respective logical resource representation 420. For example, the Log Insight™ software package may configure the logical resource representation 420' to, when a log entry 420' is generated, encapsulate the log entry 420' in a message (e.g., an IP packet) 424', and transmit the message 424' to the log entry classifier 408.

In most cases, the resource 420 is configured with an operating system 426 that administers the overall operation of the resource 420, and a bootstrap firmware 428 that launches or starts execution of the operating system during initial startup, and provides one or more low level functions for the resource 420, such as power management, cooling management, one or more security functions, and the like. Each of the operating system 426 and bootstrap firmware 428 may generate log entries during their operation. For example, the bootstrap firmware 428 may generate a log entry in the form of an alert message (e.g., a door call, a system call, etc.) in the event that a temperature of a memory storage device (e.g., hard drive) or a processor exceeds an upper threshold level. Additionally and in another example, the operating system 426 may generate a log entry in the event that a particular application executed on the resource 420 terminates unexpectedly.

The log management system 400 also includes a log entry acquisition agent 430 that is installed on the resource 420 and communicates with the log entry classifier 408 to transmit messages 424 including log entries 420 generated by the operating system 426 and/or the bootstrap firmware 428. That is, the log entry acquisition agent 430 may be configured to, when log entries are generated by the operating system 426 and/or bootstrap firmware 428, receive the log entries 420 from the operating system 426 and bootstrap firmware 428, encapsulate the log entries 420 in a message 424 and transmit the message 424 to the log entry classifier 408. The message 424 may be any type, such as an Internet protocol (IP) packet that includes a source address 432 indicating to the log entry classifier 408, which resource 420 generated the log entry 420. The log entry classifier 408 may, upon receipt of the message 424, append a date/time stamp to the log entry indicating a date and time that the log entry 420 was received, and a unique identifier that may be used to correlate the log entry 420 with a corresponding log entry 420' received from the logical resource representation 420' associated with the resource 420.

In some cases, an event that triggers the generation of a log entry from the hardware resource 420 may also cause the generation of a log entry 420' from its respective logical resource representation 420'. For example, a reboot operation may cause both the bootstrap firmware 428 and the logical resource representation 420' associated with the resource 420 to generate log entries. Thus, when such an event occurs, the log aggregation and analysis application 404 may be provided with log entries from both the hardware resource 420 and its associated logical resource representation 420' to provide enhanced analysis of how and why the reboot operation was triggered. Such a feature may provide advantages over conventional log aggregation and analysis applications that are limited to processing log entries from the logical resource representation 420' which may not provide information regarding one or more other events that may have triggered the reboot operation. That is, log entry information associated with a reboot operation provided by the logical resource representation 420' typically cannot detect the source of the reboot request that triggered the reboot operation, whereas the log entry information provided by the bootstrap firmware 428 may provide this needed information. Thus, by combining the log entries 420 and 420' from the hardware resource 420 and the logical resource representation 420', the source the requested the reboot operation may be readily obtained.

In a particular example, the log management system 400 may combine log entries from disparate log sources, such as those that may be provided by Virtual Center™ provided by VMware™, UCS Manager™ provided by Cisco Corporation™. As shown, Virtual Center™ may generate a log entry 420:

2015-04-05T14:01:55.385-07:00 [07500 error 'SoapAdapter.HTTPService'] Failed to read request; stream: <io_obj p:0x000000000ee772d8, h:-1, <TCP '0.0.0.0:0'>, <TCP '0.0.0.0:0'>>, error: class Vmacore::TimeoutException(Operation timed out) 2015-04-05T14:01:59.583-07:00 [04032 error 'drmLogger' opID=task-internal-1-bc5816b-e6] CheckCapacity: cluster has no capacity, rsc cpu.

Additionally, UCS Manager™ may generate another log entry 420 for the same hose as shown herein below:
<?xml version="1.0" encoding="UTF-8"?><faultInst ack="no" cause="log-capacity" changeSet="" code="F0461" created="2014-12-15T14:30:35" descr="Log capacity on Management Controller on server 4/7 is very-low" dn="sys/chassis-4/blade-7/mgmt/log-SEL-0/fault-F0461" highestSeverity="info" id="191484287" lastTransition="2014-12-15T14:30:35" lc="" occur="1" origSeverity="info" prevSeverity="info" rule="sysdebug-mep-log-m-ep-log-very-low" severity="info" status="created" tags="server" type="operational"/>

As can be seen, the time formats are different, and a component identifier used to identify the host is different. In fact, some log providers may use the IP address of the resource, while others a task_id or do monikers. In one embodiment, the log management system 400 may generate a combined log entry that lists all component identifiers from each log entry 420. In this manner, users of the system may be provided with a system that includes component identifiers commonly known for each user who may be familiar with a particular type or format of component identifier.

Shown herein below is an example combined log entry that may be generated by the log management system 400 for the two example log entries 420 shown above:
{
"providerCategory":"CISCO UCS Manager",
"providerIdentifier":"192.23.90.121",
"componentIdentifierType":"dn",
"componentIdentifier":"sys/chassis-4/blade-7",
"componentDetails":{
"ipAddress":"192.23.111.2",
"applications":"CloudManage",
"os": "esxi",
"vCenterCluster":"management"
},
"log":"%27%3C%3Fxml+version%3D%221.0%22+
encoding%3D%22UTF-8%22%3F%3E+%3Cfault-
Inst+ack%3D%22no%22+cause%3D%22 log-capac-
ity%22+changeSet%3D%22%22+
code%3D%22F0461%22+created%3D %222014-12-
15T14%3A30%3A35%22+descr%3D%22 Log+
capacity+on+Management+Controller+on+server+
4%2F7+is+very-low%22+dn%3D%22sys%2Fchassis-
4%2Fblade-7%2Fmgmt%2Flog-SEL-0%2Ffault-
F0461%22+highestSeverity%3D%22info%22+
id%3D%22191484287%22+lastTransition%3D
%222014-12-15T14%3A30%3A35%22+
lc%3D%22%22+occur%3D%221%22+
origSeverity%3D%22info%22+
prevSeverity%3D%22info%22+
rule%3D%22sysdebug-mep-log-m-ep-log-very-
low%22+severity%3D%22info%22+
status%3D%22created%22+tags%3D%22server%22+
type%3D%22operational%22+%2F%3E%27"
}

The combine log entry as shown may be encoded to handle special characters. Additionally, more attributes than what is shown above may be added to the combined log entry, or certain attributes as shown may be removed on an as needed basis.

Although the system 400 as shown in FIG. 4 describes one example embodiment of a log management system 400, other example embodiments of the log management system 400 may include additional, different, or fewer components than those described herein without departing from the spirit or scope of the present disclosure. For example, another component may be provided in lieu of the modular software component 406 that performs functions similar to those provided by the modular software component 406, but communicates with the log aggregation and analysis application 404 in a different manner, such as via system calls, door calls or other type of application inter-communication technique typically provided by the operating system on which the log aggregation and analysis application 404 is executed. Additionally, the computing device 414 may communicate with the resource 420 and associated logical resource representation 420' directly without the use of the network 416. For example, the log aggregation and analysis application 404 and log entry classifier 408 may be installed on one of the resources of the distributed computing system 402 on which the resource 420 is configured that may, in some cases, negate the need for the communication network 416.

Figure 5:
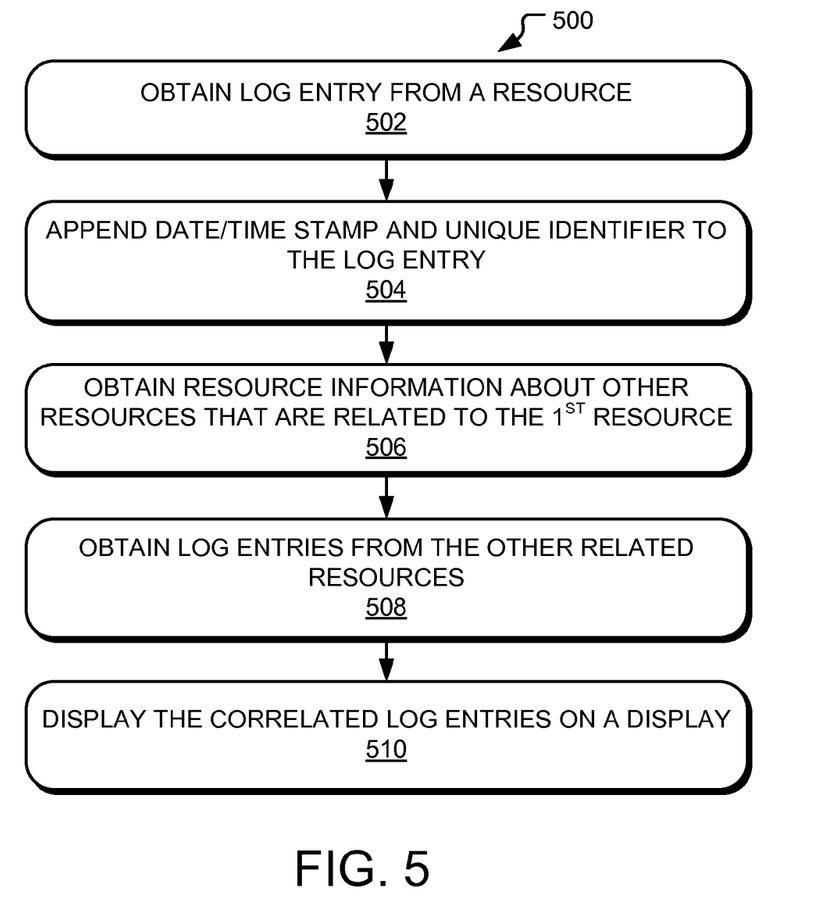
FIG. 5 illustrates an example process that is performed by the log management application according to one embodiment of the present disclosure.

FIG. 5 illustrates an example process 500 that is performed by the log management application 104 to manage log entries from resources 112 of a distributed computing system 112 along with logical resource representations 112 associated with the resources 112. Initially, the log management application 104 may be configured for use with the distributed computing system 112. For example, the log management application 104 may be installed on a computing device on which an operations management application 110 that administers the operation of the distributed computing system 112 is also installed. As another example, at least a portion of the log management application 104 may be configured as a modular software component 406 on a conventional log aggregation and analysis application 404, while other portions of the log management application 104 are installed as one or more independent executable applications on the computing device 102. Additionally, a log entry acquisition agent 430 may be installed on the resource 112 to convey log entries 118 generated by an operating system and/or bootstrap firmware of the resource to the log management application 104.

In step 502, the log management application obtains a log entry from a resource. The log entry may be obtained in response to an event that causes the resource to automatically generate the log entry, or the log entry may be obtained in response to a request generated by the log management application.

In step 504, the log management application appends additional information to the log entry, such as a time stamp and/or a unique identifier. Using this information, the log management application obtains resource information about the resource associated with the log entry from the data source. The resource information may include information about one or more other resources that have dependencies to the resource in step 506. For example, the resource information may include information about a logical resource representation generated by an operations management system that is correlated to the first resource. As another example, the resource information may include information about other resources that have physical dependencies to one another, such as a communication link (e.g., Ethernet link), or common sources of electrical power shared among the resources.

In step 508, the log management application obtains log entries from other resources that have been identified to be correlated to the first resource in step 506. For example, the log management application may obtain log entries from logical resource representations generated by an operations management system that administers the operation of the distributed computing system, which operates in a virtualized computing environment. Thereafter in step 510, the log management application displays the correlated log entries on a display, such as the GUI 322, and/or stores the correlated log entries in the data source 122 for analysis at a later time.

The previous steps may be repeatedly performed for continual log management of the distributed computing system. Nevertheless, when use of the log management application 104 is no longer needed or desired, the process ends.

Although FIG. 5 describes one example of a process that may be performed by the log management application 104 to correlate log entries from related resources of a distributed computing system, the features of the disclosed process may be embodied in other specific forms without deviating from the spirit and scope of the present disclosure. For example, the log management application 104 may perform additional, fewer, or different operations than those operations as described herein above. As another example, the steps of the process described herein may be performed by a computing system other than the computing device 102, which may be, for example, one of the resources of the distributed computing system.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk storage), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
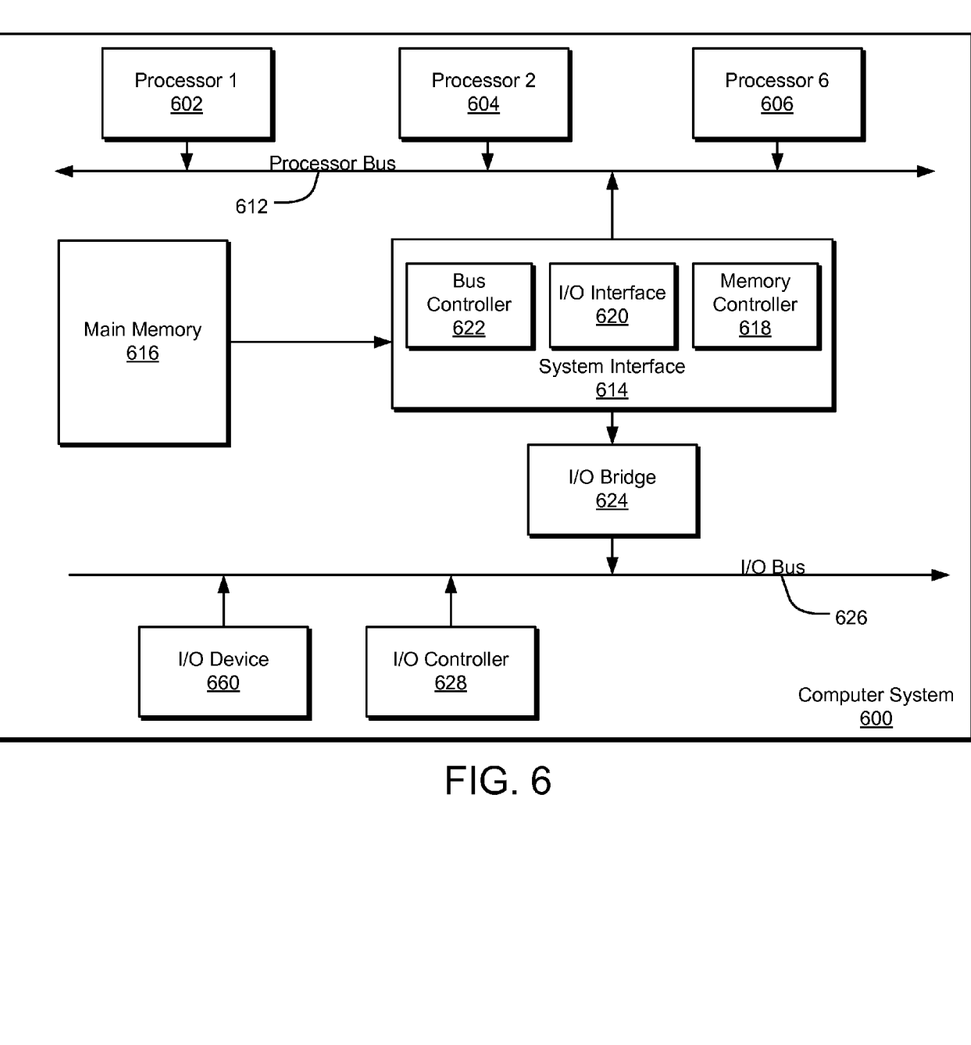
FIG. 6 illustrates an example computer system according to one embodiment of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., hard disk storage); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A log management system comprising:
    a computing device comprising at least one processor and at least one memory to store instructions that are executed by the at least one processor to:
        obtain a first log entry from a first resource of a distributed computing system;
        append a unique identifier to the first log entry, the unique identifier based on information obtained from a data packet encapsulating the first log entry;
        obtain resource information regarding the first resource by performing a lookup using the unique identifier, the resource information identifying resources of the distributed computing system correlated to the first resource;
        identify, from the resource information, a second resource of the distributed computing system, the second resource correlated to the first resource;
        obtain a second log entry from the second resource;
        generate a combined log entry from the first log entry and the second log entry, the combined log entry including data from each of the first log entry and the second log entry; and
        display the combined log entry on a display.

2. The log management system of claim 1, wherein the distributed computing system comprises a virtualized computing environment, the first resource comprises a hardware resource of the distributed computing system, and the second resource comprises a logical resource representation of the hardware resource.

3. The log management system of claim 2, wherein the logical resource representation is generated by an operations management application that administers operation of the distributed computing system.

4. The log management system of claim 1, wherein the distributed computing system comprises a computing cluster, and the first resource and the second resource comprise hardware resources of the computing cluster, wherein the resource information comprises a common dependency shared by the first resource and the second resource.

5. The log management system of claim 1, wherein the instructions are executed to append a timestamp to the first log entry and the second log entry.

6. The log management system of claim 1, wherein at least a portion of the instructions comprise a modular software component configured on a log aggregation and analysis application.

7. The log management system of claim 1, wherein the instructions are executed to determine the unique identifier by obtaining a source address from a data packet transmitted by the first resource, the unique identifier being of the first resource.

8. The log management system of claim 7, wherein the instructions are executed to correlate the second resource with the first resource by accessing a hash table that stores the unique identifier of the first resource and a unique identifier of the second resource, the first resource and the second resource correlated by at least one of (i) the first resource comprising a virtual machine that is executed on the second resource, the second resource comprising a host of the virtual machine; (ii) a communication link between the first resource and the second resource; (iii) a source of electrical power commonly shared by the first resource and the second resource; and (iv) a similar type and version of operating system used by the first resource and the second resource.

9. The log management system of claim 1, wherein the unique identifier is based on a source address of the data packet.

10. A log management method comprising:
    obtaining, using an application stored in a non-transitory medium and executed on at least one processor, a first log entry from a first resource of a distributed computing system having a plurality of resources;
    appending a unique identifier to the first log entry, the unique identifier based on information obtained from a data packet encapsulating the first log entry;
    obtaining resource information regarding the first resource by performing a lookup using the unique identifier, the resource information identifying resources of the distributed computing system correlated to the first resource;
    identifying, from the resource information, a second resource of the distributed computing system, the second resource correlated to the first resource;
    obtaining a second log entry from the second resource;

generating a combined log entry from the first log entry and the second log entry, the combined log entry including data from each of the first log entry and the second log entry; and displaying the combined log entry on a display.

11. The log management method of claim 10, further comprising generating, by an operations management application that administers operation of the distributed computing system, wherein the second resource includes a logical resource representation, and the distributed computing system operates in a virtualized computing environment.

12. The log management method of claim 10, wherein the first resource is correlated with the second resource according to a common dependency shared by the first resource and the second resource.

13. The log management method of claim 10, further comprising appending a timestamp to the first log entry and the second log entry.

14. The log management method of claim 10, determining the unique identifier is based on a source address of the data packet, the unique identifier being of the first resource.

15. The log management method of claim 10, further comprising storing the first log entry and the second log entry in at least one memory.

16. One or more non-transitory tangible computer-readable storage media storing computer-executable instructions that, when executed by one or more processors, cause the one or more processors to:

obtain a first log entry from a first resource of a distributed computing system;

obtain resource information regarding the first resource, the resource information identifying resources of the distributed computing system correlated to the first resource;

append a unique identifier to the first log entry, the unique identifier based on information obtained from a data packet encapsulating the first log entry;

identify, from the resource information, a second resource of the distributed computing system by performing a lookup using the unique identifier, the second resource correlated to the first resource;

obtain a second log entry from the second resource;

generate a combined log entry from the first log entry and the second log entry, the combined log entry including data from each of the first log entry and the second log entry; and display the combined log entry on a display.

17. The non-transitory tangible computer-readable storage media of claim 16, wherein the second resource comprises a logical resource representation and the distributed computing system operates in a virtualized computing environment, the non-transitory tangible computer-readable storage media further including instructions that, when executed by the one or more processor, cause the one or more processors to generate the second resource.

18. The non-transitory tangible computer-readable storage media of claim 16, further including instructions that, when executed by the one or more processor, cause the one or more processors to correlate the second resource with the first resource according to the resource information, the resource information including a common dependency shared by the first resource and the second resource.

19. The non-transitory tangible computer-readable storage media of claim 16, further including instructions that, when executed by the one or more processor, cause the one or more processors to determine the unique identifier, the unique identifier being of the first resource, and append the unique identity identifier of the first resource and a timestamp to the first log entry.

20. The non-transitory tangible computer-readable storage media of claim 16, wherein the unique identifier is based on a source address of the data packet.

* * * * *

UNITED STATES PATENT AND TRADEMARK OFFICE
CERTIFICATE OF CORRECTION

PATENT NO. : 10,027,534 B1  
APPLICATION NO. : 14/723006  
DATED : July 17, 2018  
INVENTOR(S) : Akshaya Mahaptra and Vandana Rao

Page 1 of 1

It is certified that error appears in the above-identified patent and that said Letters Patent is hereby corrected as shown below:

In the Claims

In Claim 14, Column 17, Line 19, after 'claim 10,' delete "determining"; and  
In Claim 19, Column 18, Line 31, after 'unique' delete "identity".

Signed and Sealed this  
Second Day of October, 2018

Andrei Iancu  
*Director of the United States Patent and Trademark Office*